United States Patent
Hill

Patent Number: 5,791,594
Date of Patent: Aug. 11, 1998

[54] HELICOPTER CONVERSION

[76] Inventor: Jamie R. Hill, 1325 SE. Fourth St., Cape Coral, Fla. 33904

[21] Appl. No.: 664,818

[22] Filed: Jun. 17, 1996

[51] Int. Cl.[6] .................. B64D 27/00; B64D 35/08; F01K 21/04; F02B 73/00

[52] U.S. Cl. .................. 244/17.19; 244/53 R; 244/55; 244/58; 244/60; 60/698; 60/716; 60/720

[58] Field of Search .................. 244/17.13, 12.5, 244/17.11, 17.19, 53 R, 54, 55, 58, 60; 60/698, 700, 711, 716, 720

[56] References Cited

U.S. PATENT DOCUMENTS

| | | | |
|---|---|---|---|
| 1,957,277 | 5/1934 | Leray | 244/55 |
| 3,002,710 | 10/1961 | Marchetti et al. | 244/60 |
| 3,255,825 | 6/1966 | Mouille et al. | 170/135 |
| 3,744,743 | 7/1973 | Nay et al. | 244/6 |
| 4,171,112 | 10/1979 | Harvey | 244/12.5 |
| 4,177,693 | 12/1979 | Ivanko et al. | 74/661 |
| 4,489,625 | 12/1984 | White | 74/665 |
| 4,811,627 | 3/1989 | Mouille | 74/665 |
| 4,831,567 | 5/1989 | Lea | 244/17.13 |
| 4,858,490 | 8/1989 | Grant | 74/661 |
| 4,969,614 | 11/1990 | Capuani | 244/12.5 |
| 5,312,069 | 5/1994 | Bollinger | 244/12.3 |

*Primary Examiner*—Virna Lissi Mojica
*Attorney, Agent, or Firm*—Frank A. Lukasik

[57] ABSTRACT

A special purpose helicopter based on an existing airframe, power train, and engine, modified to provide greatly enhanced performance, payload, speed and maneuverability. The modification consists of modifying an original helicopter universal transmission center case for installation of twin drive shafts, at 180° apart, and mounting a second engine on the airframe structure, at 180° to the first engine, and forward of the transmission. An exhaust system for the second engine is split into two units for directing the exhaust outwardly and upwardly.

3 Claims, 10 Drawing Sheets

FIG.4 SECTION A-A 5,791,594

1

HELICOPTER CONVERSION

BACKGROUND OF THE INVENTION

1. Field of the Invention

This invention relates generally to helicopters and more particularly to a method of converting an existing helicopter airframe to a special purpose use by modification of an existing Bell Helicopter universal transmission center case to grant access for installation of a twin Lycoming engine to the transmission at an installation point of 180° apart.

2. Discussion of the Prior Art

Several special purpose helicopters have been developed. One such special purpose helicopter is disclosed in my prior application, which resulted in U.S. Pat. No. 5,377,934, issued Jan. 3, 1995, which is hereby incorporated by reference in this application. The prior patent disclosed a method of converting an existing helicopter airframe, such as a UH-1H/V or a UH-1D, to a special purpose use such as a gunship or a firefighter. This invention also includes a Model No. UH-1H and a 205 A1.

Other prior art pertaining to the invention include U.S. Pat. No. 3,255,825 to Mouille et al which discloses a transmission box for multi-engine, single rotor helicopters. The single rotor is powered by three gas turbine engines being disposed as symmetrically as possible relative to the helicopter centerline and one turbine being mounted slightly to the right of the centerline. The power from these engines is transmitted to the rotor shaft through a transmission box comprising a casing bosy and a cover.

U.S. Pat. No. 4,177,693 to Ivanko et al discloses a combining reduction and accesory gear box receiving power input from a multiple of gas turbine engines which includes provisions for providing separate accessory drives for each engine used with it, and an output drive that is driven by any number or all of the engines. Each gas turbine engine, as well as the gears assocoated therewith and its connection to the output drive, is totally independent of the other engines.

U.S. Pat. No. 4,489,625 to white discloses a split torque transmission in which a high speed engine drives a substantially lower speed drive shaft, such as a helicopter rotor drive shaft, comprises a pair of selectively laterally inclined cross shafts for driving a pair of helicopter engines with the helicopter rotor drive shaft.

U.S. Pat. No. 4,811,627 to Mouille discloses a main transmission gearbox for a twin-engined helicopter. The torque received at the gearwheel is transmitted to the driving shaft of the main rotor by way of a supplementary reduction stage of epicyclic type. A third chain comprises two input pinions each of which is mounted upon one of the input shafts and an intermediate pinion which drives the driving shaft of the anti-torque rotor, ensures the distribution of power over the two main chains in the event of breakdown of one engine.

U.S. Pat. No. 4,858,490 to Grant discloses a two motor redundant drive mechanism where the two motors have an input to an all-spur gear mechanism where either motor can be energized to drive the output shaft. The invention may be used on trains and aircraft and space applications.

Each of the above prior art patents pertain to original modifications in the conventional design of aircraft to accomplish a specific, unique operation. None of the references deal with the process of taking a conventional, multi-passenger helicopter from a primary design use to a second, un-anticipated design or use.

SUMMARY OF THE INVENTION

In particular, the process of the invention utilizes conventional military and/or civilian helicopters, and changes the

2 configuration from a single engine to twin engines capabilities which will enhance the safety of the aircraft while permitting the aircraft to operate at its optimum performance over a wider range of operating temperature, and locations around the world (hot weather and higher altitude). These changes in configuration will not alter the flight controls, or drive train, with the engine controls accessible to both the pilot and copilot during operation. By modifying the existing Bell Helicopter Universal transmission center case or manufacture of a new center case which has these modifications incorporated onto the manufacturing process, this modification for the transmission center case will permit access for installation of the twin Lycoming T53 engines to the transmission at an installation point of 180° apart. In a second embodiment, the invention converts the helicopter from a dual-piloted, multi-passenger aircraft to a helicopter gunship flown by a single operator/pilot. Other potential special uses include observation aircraft, fire fighting or emergency rescue. The additional engine and modification of the transmission center case upgrades the Huey helicopter to a heavy lift helicopter with the additional reliability and safety of having two engines.

The helicopter produced by this invention is based on a highly successful airframe power train and engine, but would be modified so as to provide greatly enhanced performance, payload, speed and maneuverability. The invention produces a technically sound, relatively unsophisticated and rugged aircraft, which would enjoy low operating costs, and simple maintenance procedures. By modifying existing airframes and using totally remanufactured engines and components, the cost of production of the invention will be about one third that of the Bell AH-1 Cobra gunship.

The relatively low cost, reliability and performance of the aircraft would insure a substantial worldwide market.

It is therefore an object of the invention to produce a helicopter gunship or other special use aircraft from the skeleton of an existing helicopter airframe.

It is another object of the invention to produce a reliable, heavy lift helicopter from an existing helicopter airframe using the same engine, modifying the transmission case, adding a second engine, and other dynamic components to insure reliability and ease of maintenance.

These and other objects will become more clear upon a consideration of the following description of a preferred embodiment. BRIEF DESCRIPTION OF THE DRAWINGS FIG. 1 is a top plan view of a universal transmission center case with a dotted lower portion to be replaced in accordance with the invention.

DESCRIPTION OF THE PREFERRED EMBODIMENT

Figure 1:
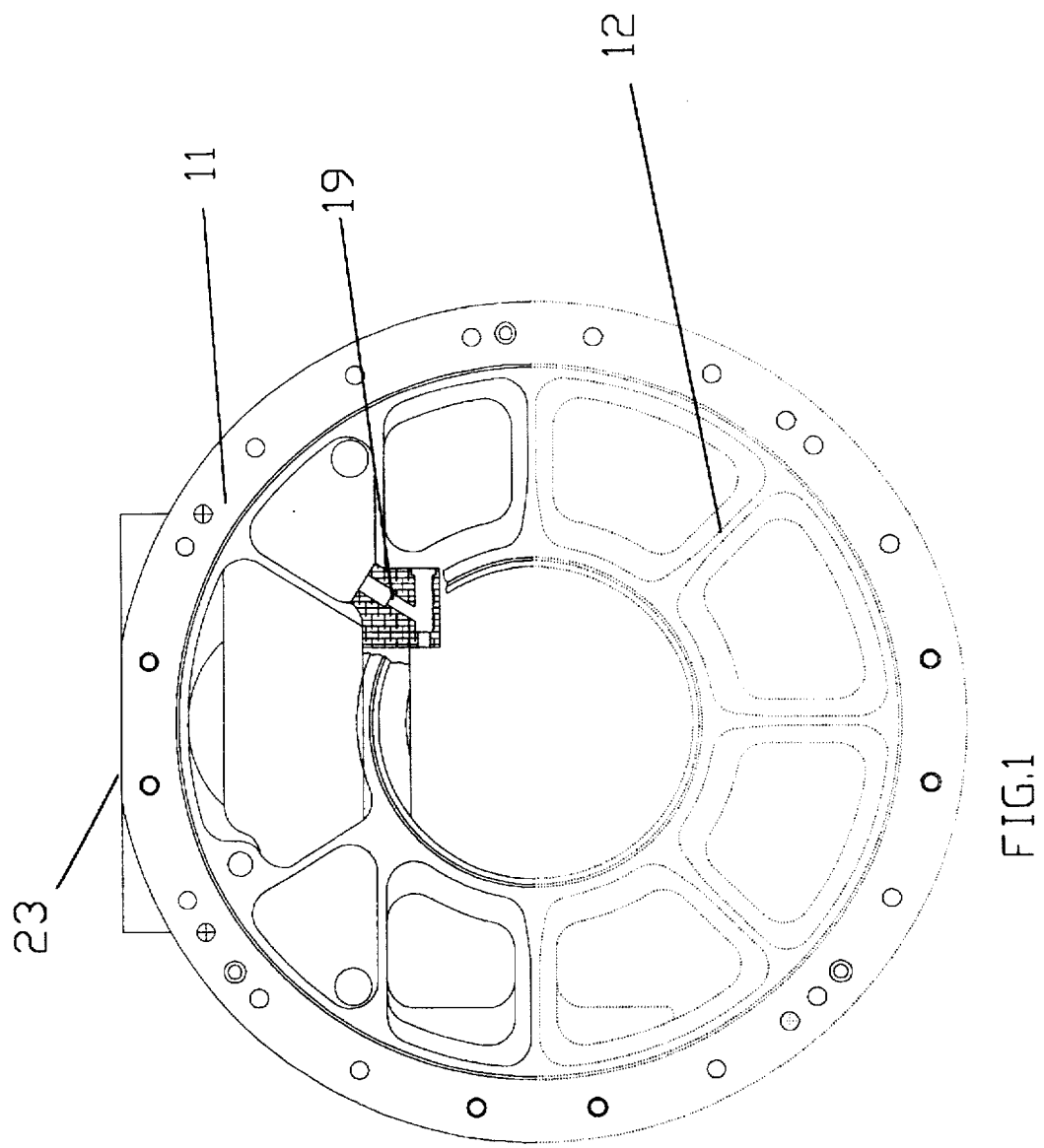
Figure 1A:
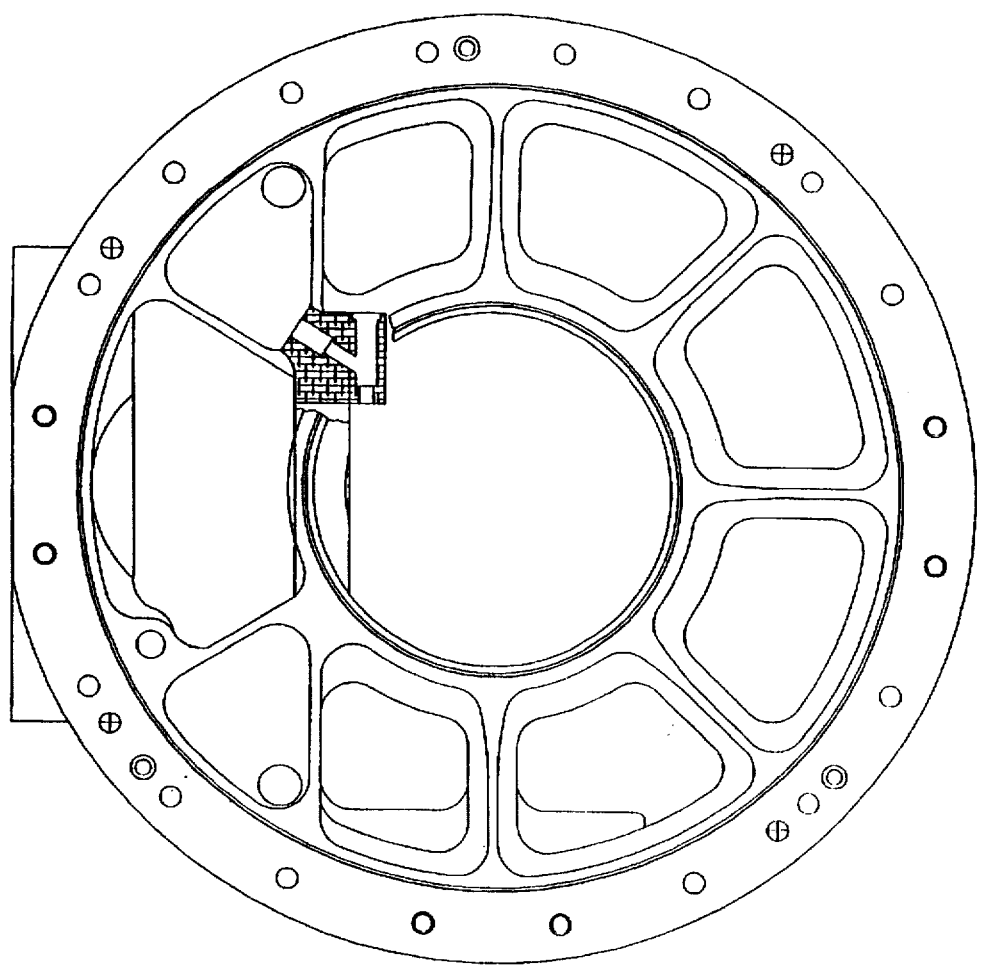

The invention is a process of converting an existing helicopter airframe into a twin engined helicopter, and the assembly and manufacture of a helicopter having new and enhanced capabilities, or a helicopter gunship or other special use aircraft. The top view of the prior art Bell helicopter universal transmission center case that is utilized on the Bell helicopter UH-1 Series and 205A1 Series is shown in the Prior Art figure. The modified transmission center case is designated generally by the numeral 10. FIG. 1 is a top view of case 10 showing the original case 10 with a dotted lower portion 12 which is replaced in the modification.

In a preferred embodiment, the case 10 is separated at the midpoint of the casing 11 and the lower portion 12 (replaced portion) as indicated by the dotted lines. The separation can be done in any state of the art manner including cutting. Two components of the casing 11 which are required for the modification are the existing opening 23 for the main drive shafts 44, and an oilway 19 which are both shown in FIG. 3. As an alternative to modifying an existing case 10, a new transmission case may be manufactured with the drive shaft openings 23 and the oilways 19 located as shown in FIG. 3.

Figure 2:
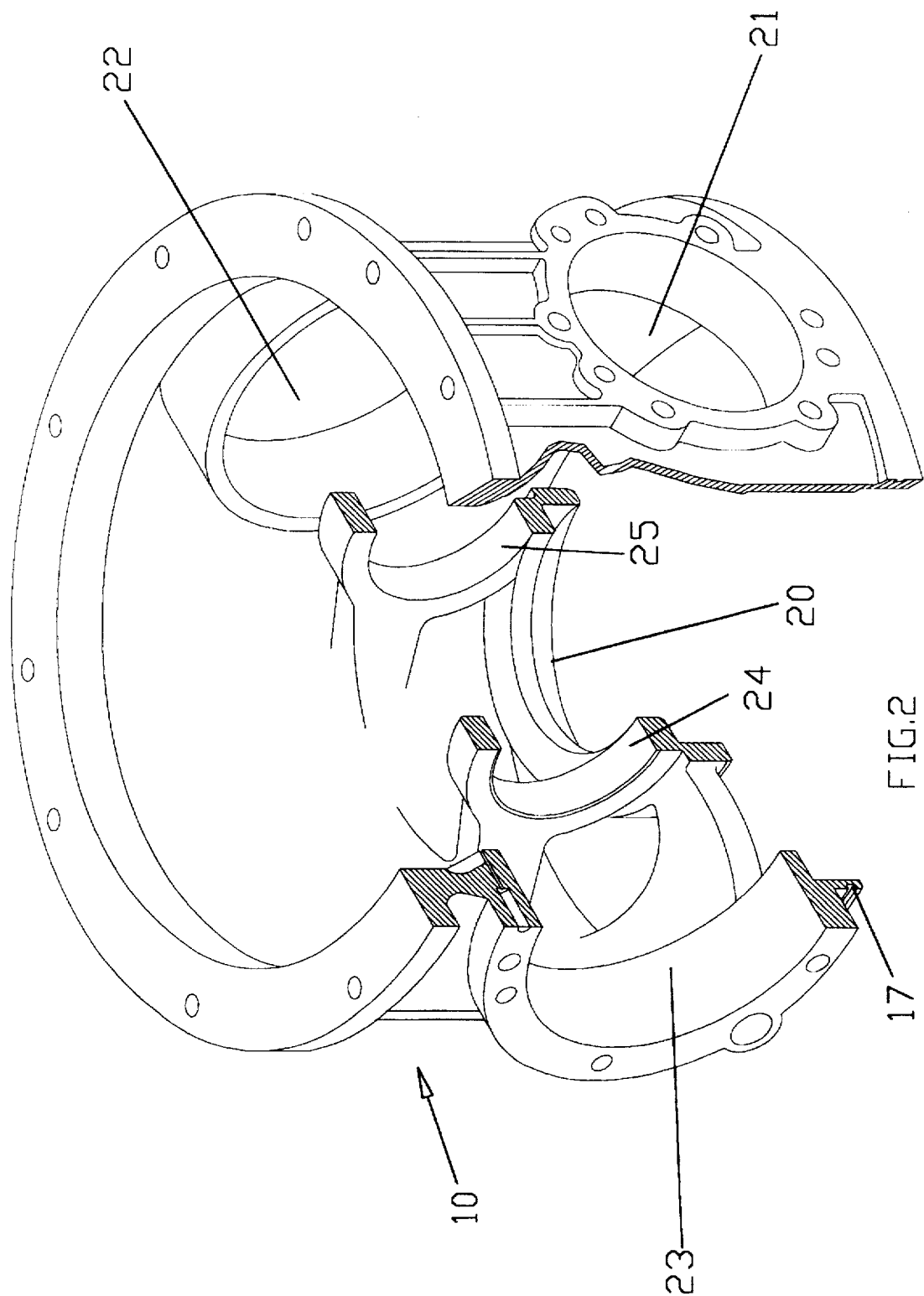
FIG. 2 is a top isometric view of the modified transmission center case, partially in section.
Figure 3:
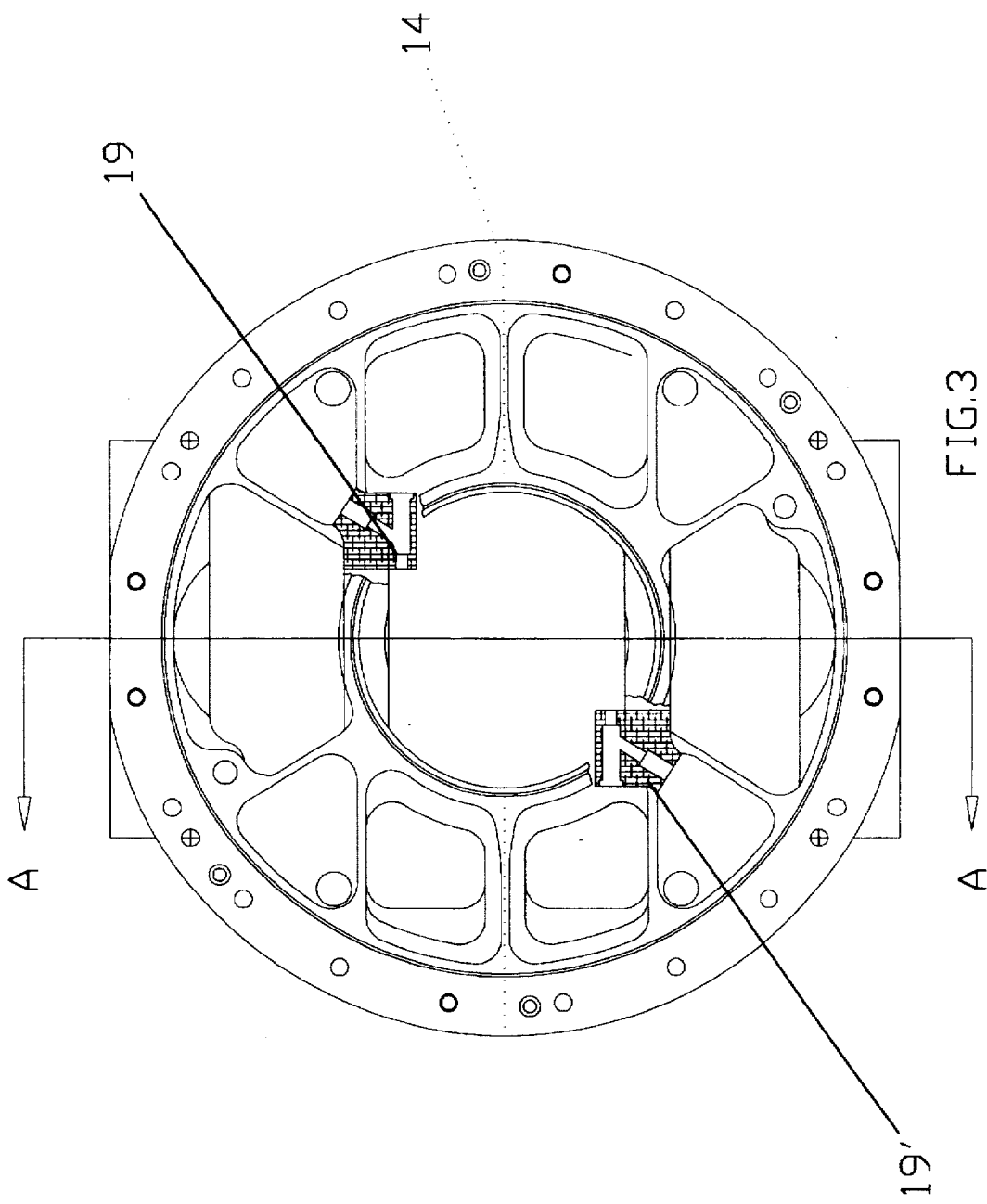
FIG. 3 is a top plan view of the universal transmission center case modified in accordance with the invention.

Removing the transmission center case 10 and replacing it with a newly designed case 11 permits the installation of twin input quills (drive shafts 44) at 180° apart as indicated by FIGS. 2 thru 6. Two components of the casing 11 which are required for the modification are the existing opening 23 for the main drive shafts 44, and an oilway 19 which are both shown in FIG. 3. A new transmission case may be manufactured with the drive shaft openings 23 and the oilways 19 located as shown in FIG. 3. The generator shaft opening 21 must also be provided.

FIG. 2 is a top isometric view of the modified transmission center case 10, partially in section. Details shown in cross section include drive shaft openings 22 and 23, "O" ring seal groove 17, lower bearing housing 20, drive shaft bearings 24 and 25, and generator shaft opening 21.

Figure 4:
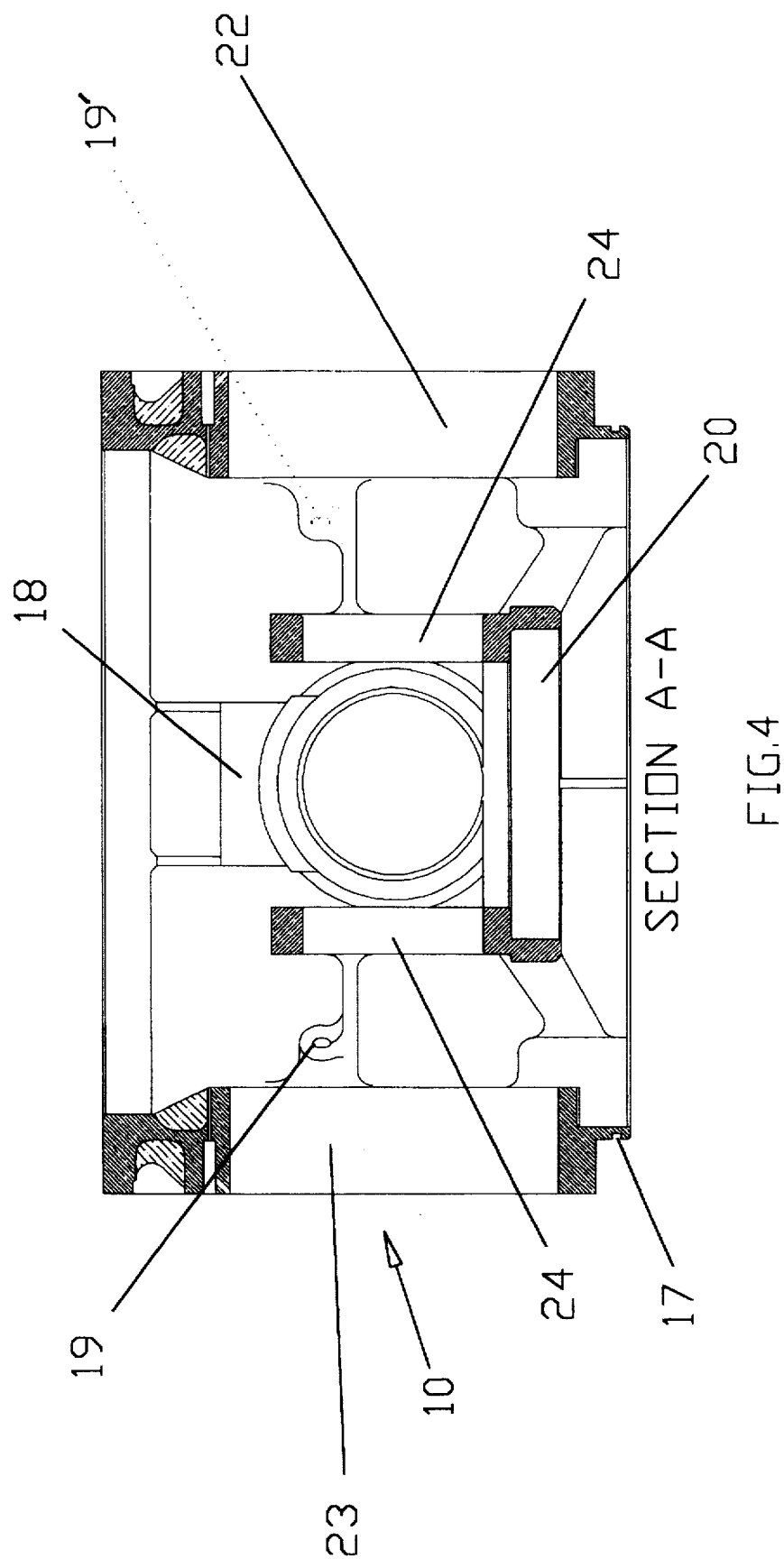
FIG. 4 is a sectional view of of the universal transmission center case along the line A—A of of FIG. 3.

FIG. 3 is the top view of the modified case 10 with the line A—A indicating the sectional view shown in FIG. 4. Dashed line 14 is the match line for the two halves of the case 10. Oilway 19 in the original case 10 is now duplicated in the new second, duplicate modified case having an oilway 19'.

FIG. 4 is a side sectional view of the modified universal transmission center case along the line A—A of FIG. 3 showing the oil retrieval scoop 18 and the oilways 19 and 19'. Also shown are the relationships of the drive shaft openings 22 and 23, the drive shaft bearings 24 and the lower bearing housing 20.

Figure 5:
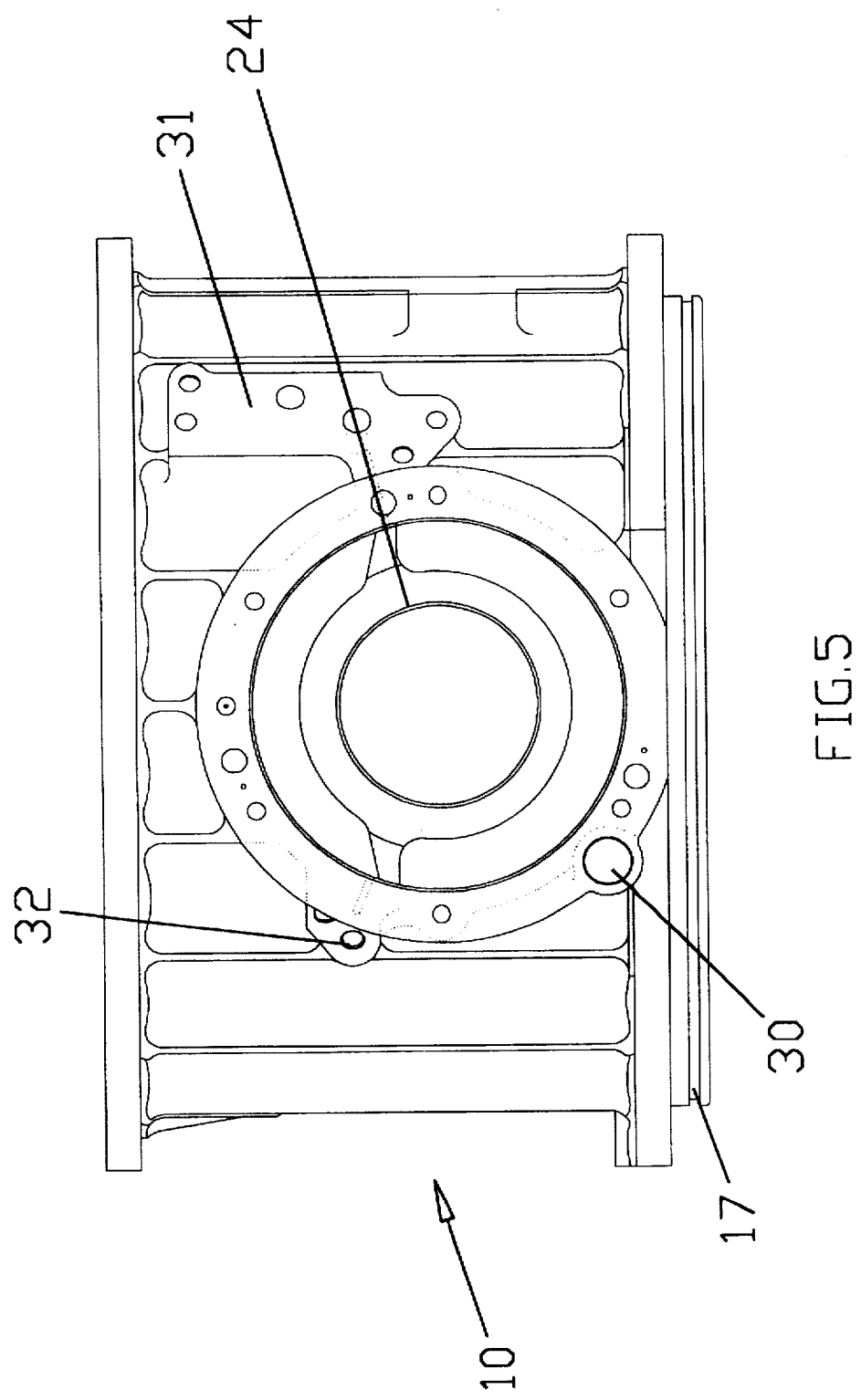
FIG. 5 is a side elevational view into the interior of the transmission center case.

FIG. 5 is a side view of the case 10 looking into the casing. The exterior of the casing 10 includes the mounting pad 31 for an oil manifold (not shown) which provides oil to the various oilways such as oilway 30 and 32. Drive shaft bearing 24 is clearly visible in the interior of case 10. Also shown is the position of "O" ring groove 17.

Figure 6:
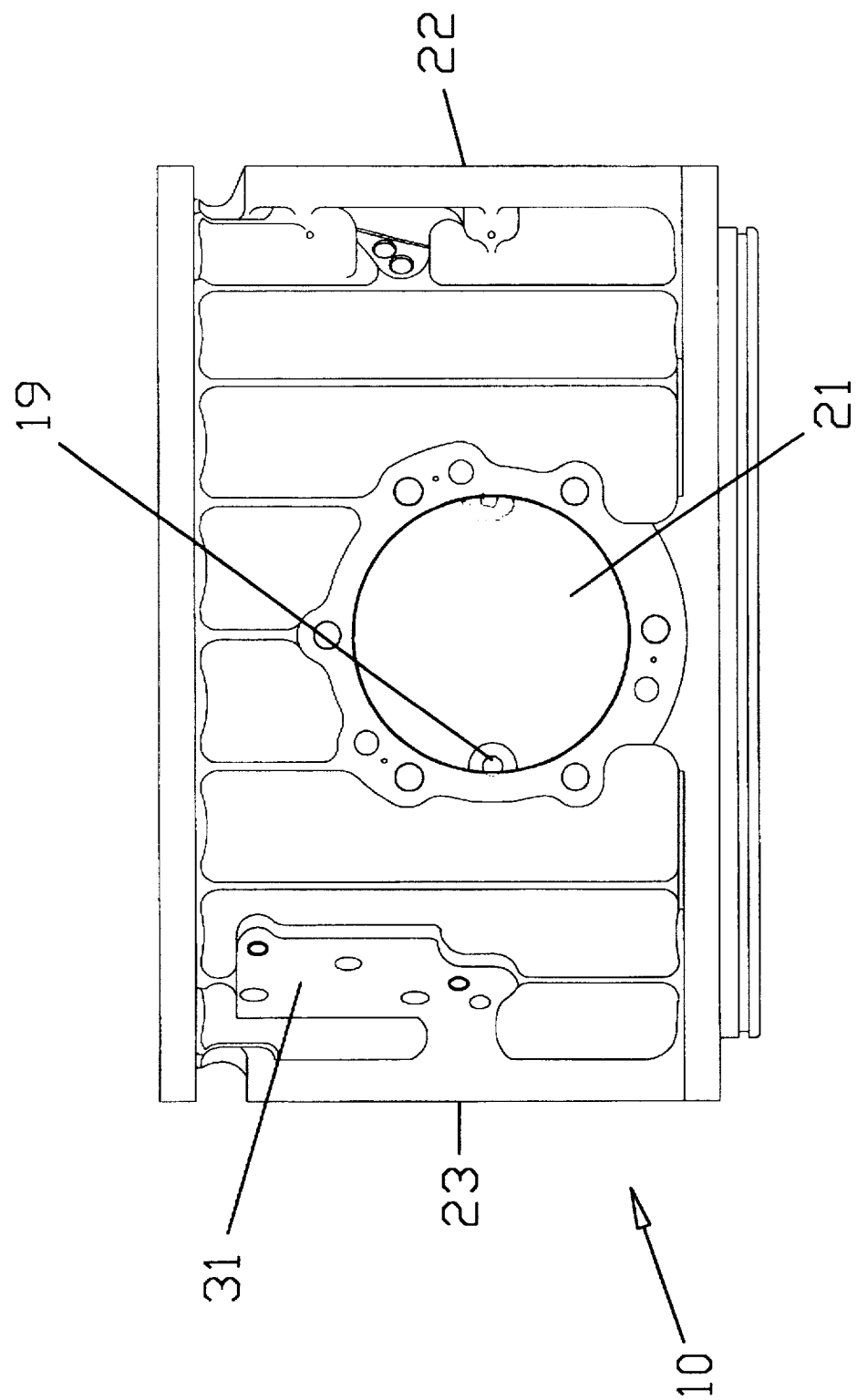
FIG. 6 is a front elevational view looking towards the opening for the generator drive.

FIG. 6 is a side view of the case 10 looking towards the generator drive shaft opening 21 showing the mounting pad 31, oilway 19, and drive shaft openings 22 and 23.

Figure 7:
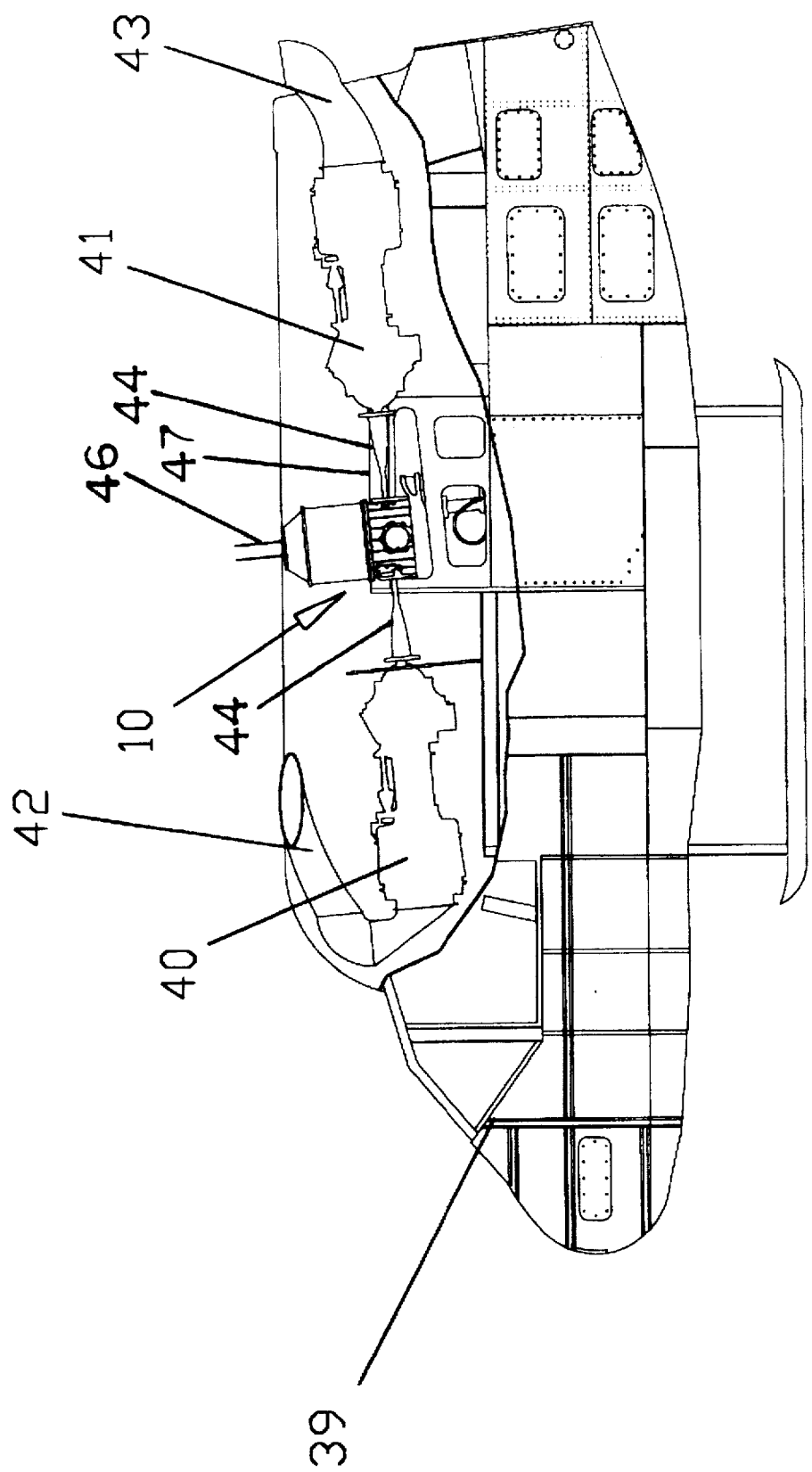
FIG. 7 is a side view, partially in section of a helicopter with a modified transmission and twin engines in accordance with the invention.
Figure 8:
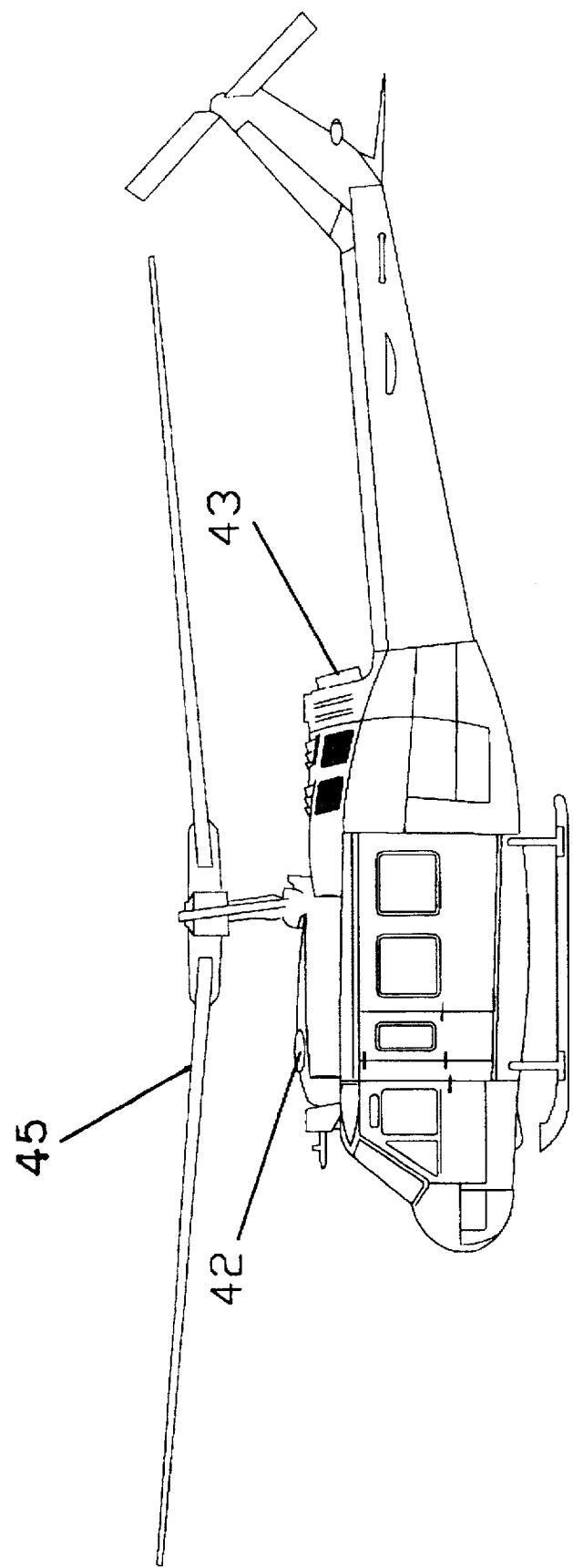
FIG. 8 is a side view of a modified Huey in accordance with the invention.

FIG. 7 is a side view of a typical mounting configuration for the modified transmission casing 10. The helicopter shown is the single seat version 39 described in my prior U.S. Pat. No. 5,377,934 which is incorporated by reference in this application. The original engine 41 and exhaust 43 are shown in their original design positions, aft of the transmission. The new, second engine 40, and exhaust 42 are shown mounted on the airframe vertical tower 47 forward of the transmission center case 10. The center pylon area for engine 40 drops into the forward passenger area. Engines 40 and 41 are connected to transmission case 10 with drive shafts 44. The drive shafts 44 may be a kaflex driveshaft installation.

Figure 11:
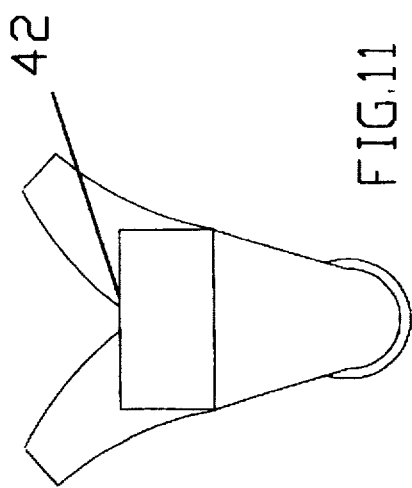
Figure 9:
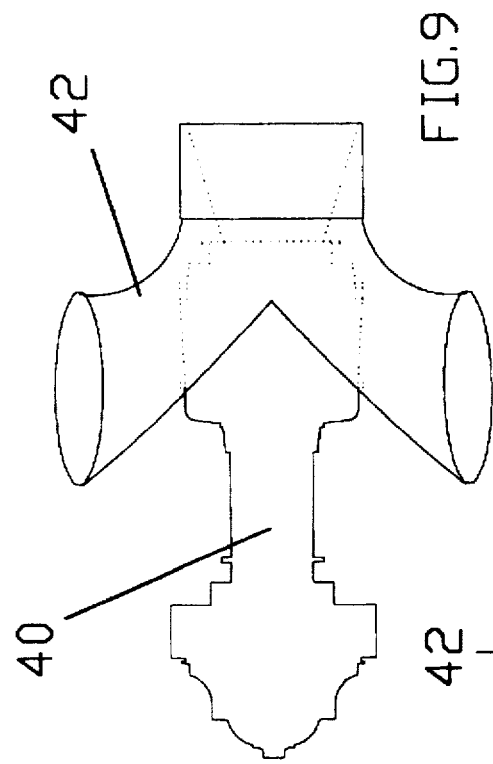
Figure 10:
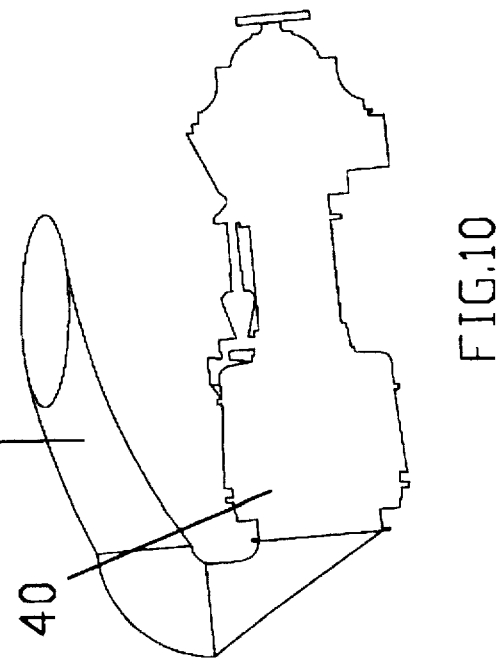

FIGS. 9–11 show the second engine 40 and exhaust 42 designed to reverse the exhaust flow toward the aft part of the aircraft. The exhaust is collected from the output of the engine 40 and split into two units before the exhaust is directed outwardly and upwardly. The engine area is 30 inches wide extending forward off the face of the transmission 10 pylon area.

The main rotor 45 is a two bladed, semi-rigid, seesaw type. The two blades are connected to a common yoke by blade grips and pitch change bearing with tension straps to carry centrifugal forces. The rotor assembly is connected to the mast with a nut. Blade pitch change is accomplished by movements of collective and a cyclic control stick. The main rotor 45 is driven by the transmission 10 through the mast 46. The 205 standard main rotor blades of rotor 45 may be replaced with the wider-chord, thin tipped 212 style blade that has been manufactured with internal fiberglass strips.

The upgrade of the UH-1H(205) into the SW205HP-T13 of the invention may include the upgrade with 212 style components such as the tail rotor blades, tail rotor hub assembly, 90° gearbox, 42° gearbox, tailboom, transmission, and drive shafts. All components will be FAA civilian and military certified 212 style components. The two engines can be the Lycoming T53-L13B. In addition to the second engine 40, appropriate instrumentation will include a triple tach, oil temperature gauge, oil pressure gauge, N1 gauge, EGT gauges and dual torque gauge.

The aircraft 39 of the invention is basically a slimmed down version of the original aircraft. A primary objective of the invention is to utilize the original, existing structure of the airframe, which is a box-like structure with a vertical tower section 47 upon which the exterior surfaces and all other equipment, including the engine, are mounted. Utilizing the original airframe, permits the use of all other manufacturer standard equipment such as the engine and transmission, landing skids, tail boom, and flight controls and equipment. For a helicopter gunship version of aircraft 39, it is highly desirable to armorplate certain vulnerable portions of the aircraft. The engine area compartment is cooled by natural convection through engine compartment screens. Three different air induction systems are used on these helicopters, a non-self-purging particle separator, a self-purging particle separator and a foreign object damage screen.

The transmission 10 is basically a reduction gearbox, used to transmit engine power at a reduced rpm to the rotor system. A freewheeling unit is incorporated in the transmission to provide a quick-disconnect from the engine if a power failure occurs. The rotor tachometer generator, hydraulic pump, and main DC generator are mounted on and driven by the transmission 10.

The tail rotor control system is operated by the pilot/copilot anti-torque pedal controls. Pushing a pedal control will change the pitch of tail rotor resulting in directional control. The tail rotor is a two-bladed, semi-rigid, delta-hinge type. Each blade is connected to a common yoke by a grip and pitch change bearing. The tail boom, not usually requiring modification, is used in both aircraft essentially as produced by the manufacturer.

The engines 41 and 42 would include a starter (integral with generator), governor (automatic), power turbine control actuator, ice detector with automatic anti-icing, magnetic chip detector, oil cooler (turbine type), fire detection system, and RPM warning system.

This invention is not to be limited by the embodiments shown in the drawings and described in the description, which is given by way of example and not of limitation, but only in accordance with the scope of the appended claims.

I claim:

1. A process of converting a highly successful helicopter airframe, power train, and engine, by adding a second engine and modifying the transmission and airframe to provide greatly enhanced performance and payload, said helicopter conversion process comprising:

modifying a helicopter airframe structure having a vertical tower section, said structure providing a frame for mounting exterior surfaces and all other equipment, including a first engine and transmission, landing skids, tail boom, fuel system, electrical system, and flight controls and equipment, modifying an original helicopter universal transmission having a center case for a single engine, dual piloted, multi-passenger helicopter, said center case being modified for installation of twin drive shafts, at 180° apart and having a generator shaft opening and oilways built within, mounting a second engine on said airframe structure, said first engine being mounted aft of said transmission with a drive shaft connected through said center case to said transmission for driving said transmission, said first engine having an exhaust system, mounting said second engine on said airframe structure forward of said transmission at 180° to said first engine, and connecting a drive shaft through said center case for driving said transmission, and connecting exhaust means to said second engine and said airframe, and splitting said exhaust means into two units for directing the exhaust outwardly and upwardly.

2. A process of converting a helicopter of claim 1 wherein said airframe is a Huey UH-1H.

3. A process of converting a helicopter of claim 1 wherein said airframe is a Huey 205 A1.

* * * * *